March 27, 1928.

J. R. GAMMETER 1,663,979

VULCANIZING APPARATUS

Filed Aug. 19, 1922

Inventor
John R. Gammeter
By Robert M. Pierson
Atty.

March 27, 1928.
J. R. GAMMETER
1,663,979
VULCANIZING APPARATUS
Filed Aug. 19, 1922    2 Sheets-Sheet 2
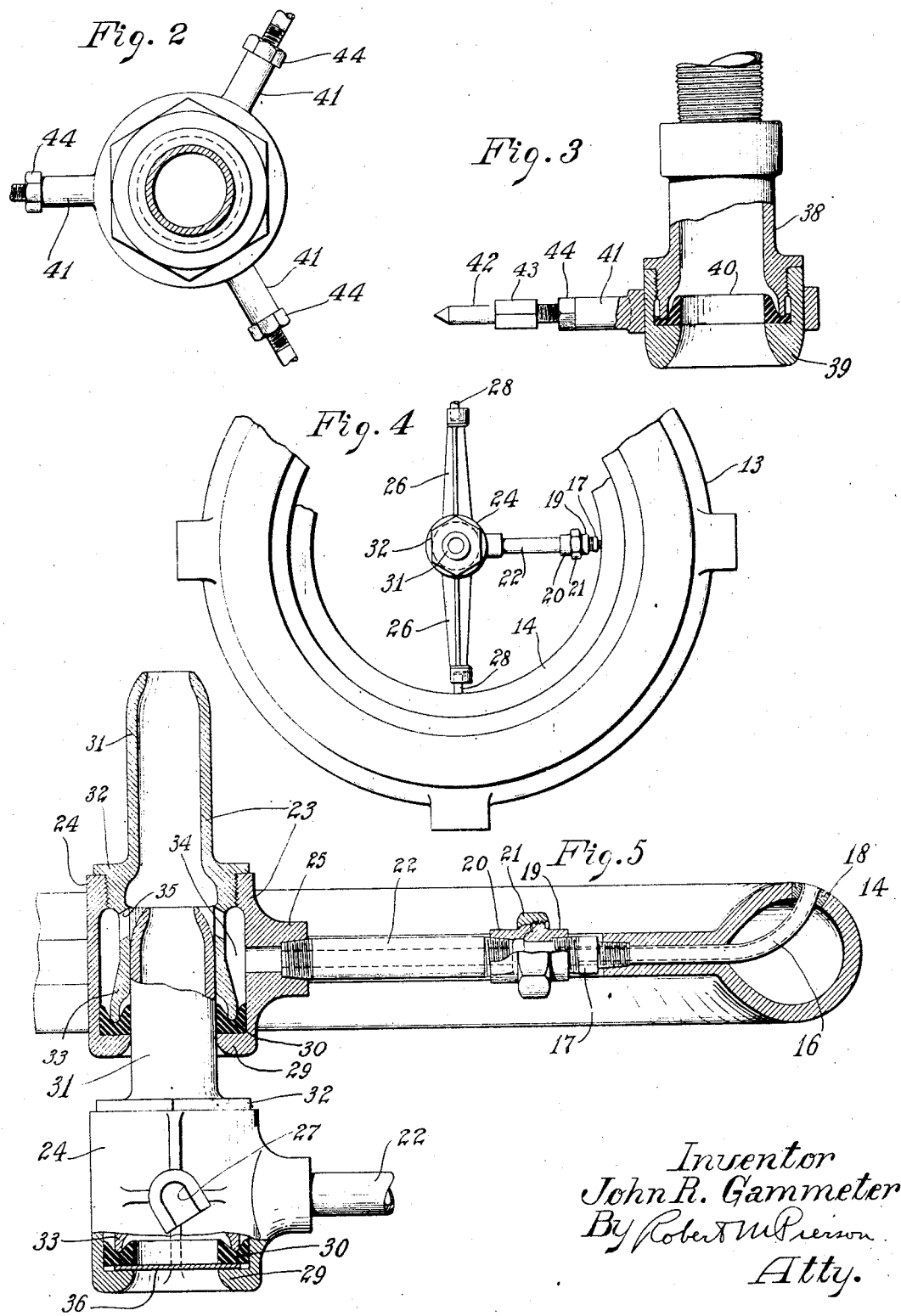
Inventor
John R. Gammeter
By Robert M Pierson
Atty.

Patented Mar. 27, 1928.

1,663,979

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

VULCANIZING APPARATUS.

Application filed August 19, 1922. Serial No. 582,956.

This invention relates to apparatus for vulcanizing hollow articles under internal fluid pressure and is especially applicable to apparatus for so vulcanizing pneumatic tire casings.

My chief objects are to avoid loss of time in the use of the vulcanizer, to avoid discomfort to the workman and in general to provide improved, convenient and effective means for applying pressure fluid to the interiors of hollow articles during vulcanization. I attain these objects by providing fluid-coupling members which may be assembled individually with their respective molds either before or after the latter are placed in the vulcanizer and may be conveniently connected with a source of fluid supply without the necessity of connecting threaded or other difficult coupling members after the molds have been assembled in the vulcanizer.

Of the accompanying drawings:

Fig. 2 is a section on line 2—2 of Fig. 1, showing an adjustable spider for securing centrally in the lid of the vulcanizer a fluid-supply pipe with a coupling member thereon.

Fig. 3 is an elevation, with parts broken away and in section, of the device shown in Fig. 2.

Fig. 4 is a plan view, with parts broken away, of a tire mold with a tire core therein and a coupling unit associated therewith.

Fig. 5 is an elevation, with parts broken away and in section, of a terminal coupling member, the adjacent coupling member, and a tire core associated with the latter.

Figure 1:
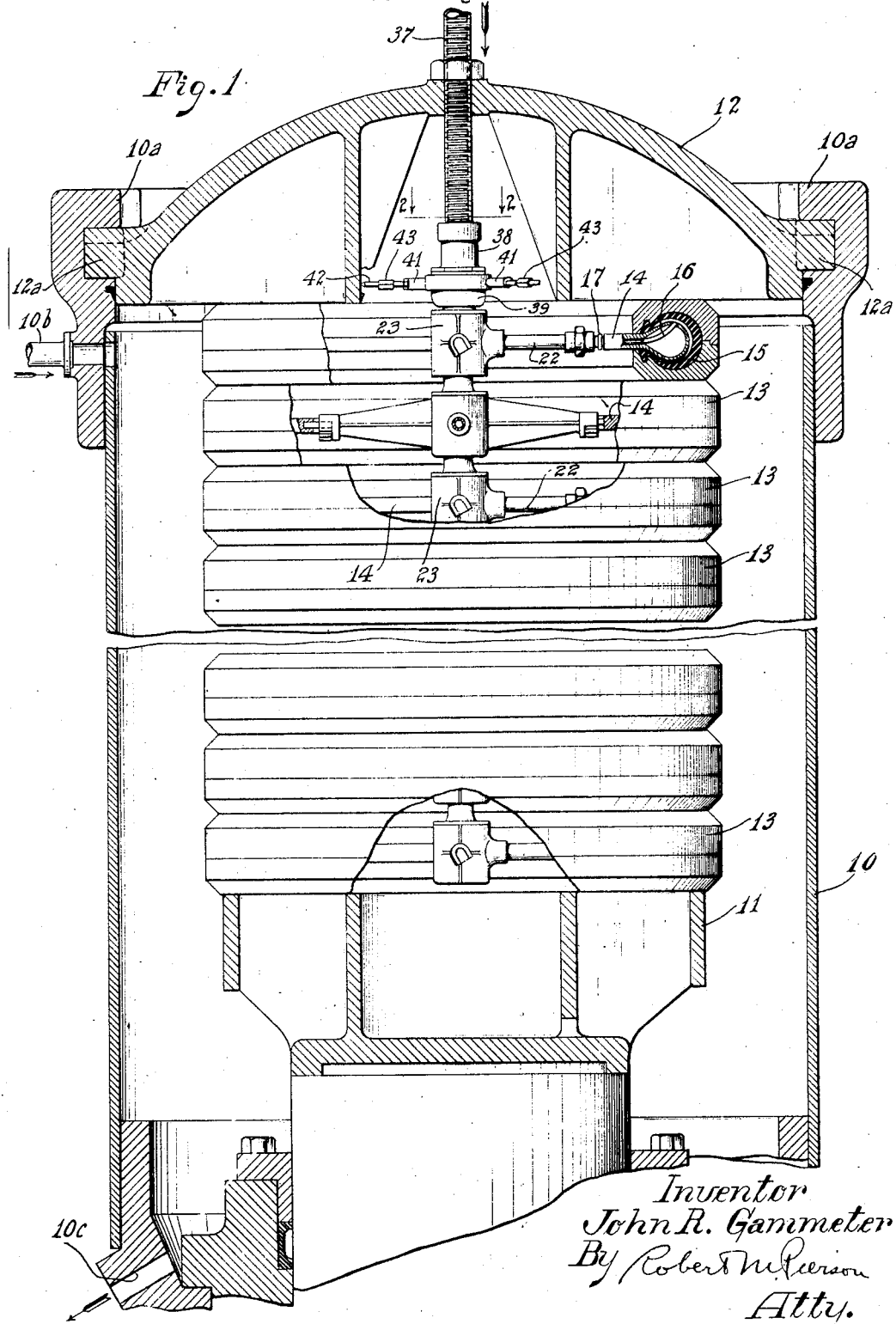
Fig. 1 is a vertical section, with parts broken away, of a vertical heater-press or vulcanizer with a stack of tire molds therein, showing a preferred form of my improved apparatus.

Referring to the drawings, 10 is a vertical vulcanizer or heater-press having the usual ram with its head 11 therein and provided with a cover or lid 12 adapted to serve as the upper platen of the press of which the ram head 11 constitutes the lower platen, said cover being formed with the usual lugs 12$^a$, 12$^a$ on its outer periphery adapted to interlock with lugs 10$^a$, 10$^a$ on the collar of the vulcanizer. Tire molds 13, 13 are stacked concentrically on said ram head, said molds respectively containing hollow, metal, tire cores 14, 14 with casings thereon, one of the latter being shown at 15. The vulcanizer is provided with the usual steam inlet pipe 10$^b$ and vent 10$^c$ controlled by suitable valves (not shown).

Each of the cores is provided with a fluid conduit 16 extending from the inner periphery of its tongue, where it is provided with a male threaded coupling member 17, to a point on the crown of the core, where said conduit opens onto the outer face of the core, being thus adapted to force pressure fluid between the core 14 and the casing 15 thereon, to distend the latter against the mold, the beads of the casing being sealed between the respective mold sections and the tongue of the core. To provide a fluid tight fit between the conduit 16 and the wall of the core which it traverses, so as to avoid the necessity of building up pressure in the interior of the hollow core, a taper-threaded, soft-metal bushing 18 is mounted upon the end of said conduit 16 and screwed into the wall of the core. While I have shown and described this particular type of core, my invention is not wholly limited to this means for closing the space between the beads of the casing or confining the injected pressure-fluid to the space within the casing.

Threaded upon the male coupling member 17 is an externally threaded swivel-coupling member 19 adapted to receive and form a seal against a complementary swivel-coupling member 20 under action of a female-threaded ring 21 swiveled on said member 20, the latter being threaded on the end of a pipe 22 projecting from the side of a coupling device 23 adapted to be secured concentrically in the space surrounded by the core 14.

Said coupling device 23 comprises a hollow-hub member 24, having on one side an apertured boss 25 into which the pipe 22 is threaded and, 90° each way from said boss, rigid arms 26, 26, each with an oblique, open-sided U-shaped recess 27 in its outer end adapted to receive a stud 28 projecting from the inner periphery of the core 14, as said hub member is moved downward and toward the coupling member 19 in setting up the swivel coupling 20, 21, 19, the oblique position of the recesses 27 being such that the hub member may be introduced to the core from substantially an axial direction without swinging the pipe 22 far downward, and yet when said swivel-coupling is tightened the arms 26 are interlocked with said studs against substantial axial movement with respect to the core.

The lower portion of the hub-member 24 is formed with an opening surrounded by an inwardly projecting flange 29 seating a two-flanged lip-packing member 30, preferably of soft rubber, the outer lip or flange of which is adapted to seal against the inner wall of said hub member and the inner lip against the male portion 31 of a coupling member 32 of the next adjacent coupling device, each of said hub-members having such a coupling member threaded in its upper end, with its male portion projecting upwardly, and having a female portion 33 extending downward into the hub member and serving as a guide for the male portion of the adjacent coupling device and as a clamp for securing the lip-packing member 30 on its seating flange 29. The female portion 33 of the member 32 is of such size as to leave a space 34 about it within the hub member 24, said space being in communication with the core 14 through the pipe 22, and said female portion 33 is formed with apertures 35, 35 through the upper part of its wall, whereby the male portion 31 is in communication with said space 34.

The several coupling devices 23, associated with their respective tire cores and molds, are adapted to be telescopically assembled, one upon another as indicated in Figs. 1 and 5, upon the ram head 11, the members 32, sealed against each other by the lip-packings 30, forming a fluid conduit, manifold or "tree," from which branches, through the apertures 35, spaces 34 and pipes 22, run to the several cores 14. For closing the lower end of said conduit, the lowermost coupling device is provided with a closure plate 36 (Fig. 5) clamped between the lip-packing 30 and the flange 29.

For supplying pressure fluid to said conduit, a pipe 37 is threaded through the center of the heater-press cover 12 and provided at its lower end with a female coupling member comprising a guiding and gasket-clamping member 38 threaded onto said pipe and adapted to serve as a guide for the male portion of the uppermost coupling device 23. Threaded onto the lower end of said member 38 is a gasket-clamping ring 39 adapted to admit said male portion, and 40 (Fig. 3), is a lip gasket clamped between the ring 39 and the member 38 and adapted to seal against said male portion of the uppermost coupling device 23.

The gasket clamping ring 39 is formed with three radial spider arms 41, 41, into the outer ends of which are threaded respective pointed stud-bolts 42, 42 having squared portions 43, 43 to facilitate their adjustment, the outer ends of said bolts being adapted to seat in suitable depressions (not shown) in adjacent parts of the heater press cover to position the coupling members 38, 39, 40. Locking nuts 44, 44 are provided on the bolts 42 to prevent their loosening after said coupling members have been accurately positioned.

In the operation of the apparatus, the cores with the coupling members 17 and 19 attached thereto and with their tire casings thereon, are enclosed in the molds as in common practice, and, before the molds are put into the vulcanizer, one of the coupling devices 23 is assembled with each core by fitting its recessed arms 26 over the studs 28 and screwing the swivel-coupling ring 21 onto the member 19, the parts being so proportioned that the coupling member 32 is held centrally within the core, the studs 28 interlocking with the recessed ends of the arms 26, as above described, so that each coupling device and its core constitute substantially a unitary, rigid structure. A coupling device provided with a closure plate such as is shown at 36 (Fig. 5) is used for the cores of each heat of tires, and such core, with the tire and mold thereon and the coupling device mounted therein is placed first upon the ram head 11, and carefully positioned concentrically thereon, the ram being raised to the top of the vulcanizer to receive the mold, as in common practice with regard to casings not requiring internal fluid pressure. The other cores with their associated parts as described are then stacked in succession upon the first core and mold assembly upon the ram head, the latter being gradually lowered to facilitate the work by keeping the top of the growing stack at about the level of the top of the vulcanizer, each successive coupling device 32 being fitted onto the one last placed, as shown in Figs. 1 and 5. The coupling members 32, as shown, are of such form and length that the weight of the molds is sustained by the contact of the molds with each other, the lip-packing 30 effecting a seal between the coupling members 32 without requiring that the latter be thrust into each other to their limit.

When the allotted number of molds, with their cores and coupling devices, have thus been mounted upon the ram head, the latter is lowered so as to bring the top of the mold stack below the top of the vulcanizer, and the cover 12 is placed on the latter and given a partial turn to lock it in position, the lugs 12ᵃ interlocking with the lugs 10ᵃ. The ram is then raised, causing the male portion of the uppermost coupling device 23 to enter the members 39, 38 secured on the pipe 37, effecting a seal with the lip-packing 40, as the uppermost mold abuts the cover 12 to hold the molds closed and seal the bead portions of the tires against the cores. Since the molds are practically never fully closed upon the tires by their own weight, the pressure of the press members will effect a complete closure and at the same time move the previously interfitted conduit sections 32 further together in coupled relation. Steam is admitted to the vulcanizer according to such time and temperature schedule as may be preferred, and the tires are thus vulcanized. At such time as may be preferred the tires are expanded against the molds by admitting pressure fluid to the space within the tires through the pipe 37, the conduit formed by the series of coupling members 32, and the pipes 22 branching therefrom. After vulcanization, the molds with their associated parts are removed from the vulcanizer by a reversal of the procedure just described.

Delay in loading and unloading the vulcanizer is avoided, the connections between successive mold assemblies being made by simply stacking one of the latter on top of another, and the connection with the fluid-supply pipe 37 being automatically made by the rising of the ram. The lip-packing 30 affords an effective seal notwithstanding inequalities in the thickness of the molds and resultant inequalities in the penetration of the coupling members 32 into each other, and said lip-packing may readily be replaced by unscrewing the coupling member 32 from the casing member 24. It will be obvious that such inequalities may be further compensated and the sealing of the manifold sections perfected after the lower platen has been raised, by screwing the supply pipe 37 down through the cover 12, the radial supports such as 26 or 41 of the sections yielding sufficiently to permit this or being loosened or even omitted, if desired, except as to the supports of the lowermost section.

Modifications may be resorted to without departing from the scope of my invention, and I do not wholly limit my claims to the specific construction shown and described.

The side-sealing form of rubber lip-packing 30 shown herein is particularly useful where hot water is the pressure fluid used for distending the tires during vulcanization, but my invention is not wholly limited to this means for effecting a seal between the sections of the manifold, nor is it wholly limited to the use of supports for these sections such as the rigid arms 26, nor to the use of branch pipes such as 22, which are rigid in character, for connecting the sections with the interiors of the molds.

I claim:

1. Vulcanizing apparatus comprising a heater press, a ram having its head therein, a plurality of molds stacked upon said ram, means associated with each of said molds for conducting pressure fluid into a hollow article confined therein, each said means including a plug-and-socket coupling device and the several said coupling devices being adapted to be connected in series as parts of a trunk conduit as the molds are stacked upon said ram and moved together in coupled relation by movement of said ram, means for conducting pressure fluid into said trunk conduit from the exterior of said press, and means for conducting heating fluid into said heater press.

2. An apparatus including press members for subjecting molds to treatment in combination with, means for supplying fluid to the interior of the molds, including a header composed of sections having inter-fitting seats and guiding devices on their extremities, means associated with the press members for coupling by their operation the sections of the header together, and branch connections between the sections and the molds whereby articles within the molds may be subjected to internal fluid pressure.

3. Vulcanizing apparatus comprising a plurality of molds, means associated with each of said molds for conducting pressure fluid into a hollow article confined therein, each said mold and said means being adapted to be handled as a unit, a plug-and-socket coupling device on said means having a male portion at one side and a female portion at the other side, said male and female portions being adapted to mate and seal with complementary parts of similar coupling devices associated with adjacent molds and to be coupled by relative movement in an axial direction only, to form a trunk conduit, by the act of assembling the molds with each other, means for supplying pressure fluid to said trunk conduit, and means for heating the articles within said molds.

4. Vulcanizing apparatus comprising a plurality of molds, means associated with each of said molds for conducting pressure fluid into a hollow article contained therein, a coupling device on said means adapted to mate and seal with similar coupling devices associated with adjacent molds, by relative movement in an axial direction as the molds are assembled in juxtaposition to each other, to form a trunk conduit, means for holding each of said coupling devices in fixed relation to the article contained in the corresponding mold, means for supplying pressure fluid to said trunk conduit, and means for heating the articles within said molds.

5. Vulcanizing apparatus comprising a plurality of molds, means associated with each of said molds for conducting pressure fluid into a hollow article contained therein, the several said means respectively including plug-and-socket coupling members adapted to mate and seal with each other by relative axial movement to form a trunk conduit as the molds are stacked upon each other, a vertical heater-press, a ram therein adapted to support the molds as they are so stacked, a cover for said heater press adapted to serve as an upper platen for said ram, and having a fluid passage therethrough, a coupling device constituting the lower terminal of said fluid passage and adapted to mate with the coupling device of the uppermost mold, by relative axial movement, means for closing the lower end of said trunk conduit, means for supplying pressure fluid to the fluid passage of said cover, and means for supplying a heating fluid to said heater-press.

6. Vulcanizing apparatus for pneumatic tire casings, said apparatus comprising a plurality of tire molds, a bead sealing member closing the space between the bead portions of each tire casing within its mold, means for conducting pressure fluid through said bead sealing member into the tire casing, said means including a plug-and-socket coupling member adapted to mate and seal with the similar members associated with adjacent molds by relative axial movement as the molds are stacked one upon another to form a trunk conduit, a vertical heater press, a ram therein adapted to support the molds as they are so stacked, a cover for said heater-press adapted to serve as an upper platen for said ram and having a fluid passage therethrough, a coupling device constituting the lower terminal of said fluid passage and adapted to mate with the coupling device of the uppermost mold, by relative axial movement, means for closing the lower end of said trunk conduit, means for supplying pressure fluid to the fluid passage of said cover, and means for supplying a heating fluid to said heater press.

7. Vulcanizing apparatus comprising a plurality of molds, means associated with each of said molds for conducting pressure fluid into a hollow article contained therein, said means including a coupling device comprising a male portion and a female portion, the complementary portions of the several said coupling devices being adapted to mate with each other by relative axial movement, and a lip-packing adapted to seal each female portion against its mating male portion.

8. In apparatus of the character described, the combination of means for supporting a hollow article to be vulcanized, means for heating said article, and means for conducting pressure fluid into said article, said means including a coupling device comprising a hub member having a branch conduit leading to the article from a side of said casing member and a gasket seat surrounding an opening at one end of the latter, a coupling member threaded into the opposite end of said hub member and having a smooth male coupling portion projecting from said hub member and a gasket-clamping portion within said hub member, said coupling member being so formed as to afford communication between said male coupling portion and said branch conduit, and an annular lip gasket clamped between said gasket-clamping portion and said gasket seat, said gasket being adapted to seal against the smooth male coupling portion of a similar coupling device.

9. In apparatus of the character described, the combination of means for supporting a hollow article to be vulcanized, means for heating said article, and means for conducting pressure fluid into said article, said means including a coupling device comprising a hub member having a branch conduit leading from a side thereof, a coupling member threaded into one end of said hub member and having a smooth male coupling portion projecting from said hub member and a female guiding portion within said hub member adapted to receive and guide the smooth male coupling portion of a similar coupling device, said coupling member being so formed as to afford communication between said male coupling portion and said branch conduit, and a lip-gasket in said casing member adapted to seal against the male coupling portion of said similar coupling device.

10. In apparatus of the character described, the combination of means for supporting a hollow article to be vulcanized, means for heating said article, and means for conducting pressure fluid into said article, said means including a coupling device comprising a hub member having a branch conduit leading from a side thereof and a gasket seat surrounding an opening at one end thereof, a coupling member threaded into the opposite end of said hub member and having a smooth, male coupling portion projecting from said hub member and a female guiding and gasket clamping portion within said hub member, said coupling member being so formed as to afford communication between said male coupling portion and said branch conduit, and a lip-gasket clamped between said guiding and gasket-clamping portion and said gasket seat, said guiding and gasket-clamping portion being adapted to receive and guide, and said gasket to seal against, the male coupling portion of a similar coupling device.

11. An apparatus including press members for subjecting molds to treatment in combination with, means for supplying fluid to the interior of the molds, including a header composed of sections with inter-fitting ends, means associated with the press members for coupling by their operation the sections of header together, and branch connections between the sections of the header and the molds.

12. An apparatus comprising molds assembled in a series, detachably interfitted conduit sections forming a header and having individual branch connections with the interiors of the molds, and pressing means acting endwise on said header, for moving the sections together in coupled relation.

13. Vulcanizing apparatus comprising a heater pot having an opening closed by a cover, molds adapted to be assembled in a series through said opening, a header composed of separable sections telescopically fitted together and having branch connections for supplying fluid to the individual molds, and means for moving said header sections together in telescoped relation after they have been assembled in the heater.

In witness whereof I have hereunto set my hand this 15th day of August, 1922.

JOHN R. GAMMETER.